United States Patent [19]

Jespersen et al.

[11] 4,250,917
[45] Feb. 17, 1981

[54] AIR FLOW REVERSER SYSTEM

[75] Inventors: Knud Jespersen, Terracotta; Hans L. Bergner, Mississauga; Guy E. Buller-Colthurst, Rexdale, all of Canada

[73] Assignee: Knud Simonsen Industries Limited, Rexdale, Canada

[21] Appl. No.: 959,832

[22] Filed: Nov. 13, 1978

[51] Int. Cl.³ .............................................. F26B 21/04
[52] U.S. Cl. ...................................... 137/563; 34/191; 137/601
[58] Field of Search .............. 34/191; 98/32; 137/563, 137/601, 625.31, 625.43, 625.44

[56] References Cited

U.S. PATENT DOCUMENTS

| | | | |
|---|---|---|---|
| 1,848,811 | 3/1932 | Welch | 34/191 |
| 2,078,515 | 4/1937 | Sutherland | 34/191 X |
| 2,311,824 | 2/1943 | Gautreau | 34/191 X |
| 2,347,601 | 4/1944 | Jackson | 34/191 X |
| 2,370,886 | 3/1945 | Solberg | 34/191 X |

Primary Examiner—Robert G. Nilson
Attorney, Agent, or Firm—George A. Rolston; William F. Frank

[57] ABSTRACT

An air flow reverser apparatus for use in association with an air flow system having air supply and return port means, said apparatus comprising a main supply duct, and a main return duct, said ducts being connectable to said respective supply and return port means of said air flow system, at least two branch supply ducts communicating with said main supply duct, at least two branch return ducts communicating with said main return duct, supply damper means for selectively shutting off at least one of said branch supply ducts, while leaving at least one said branch supply duct open, return damper means for selectively shutting off at least one of said branch return ducts while leaving at least one said branch return duct open, and means interconnecting said supply and return damper means whereby when a selected one of said branch supply ducts is closed, a selected one of said branch return ducts is open, and power operated means for moving the same from one position to another simultaneously.

8 Claims, 7 Drawing Figures

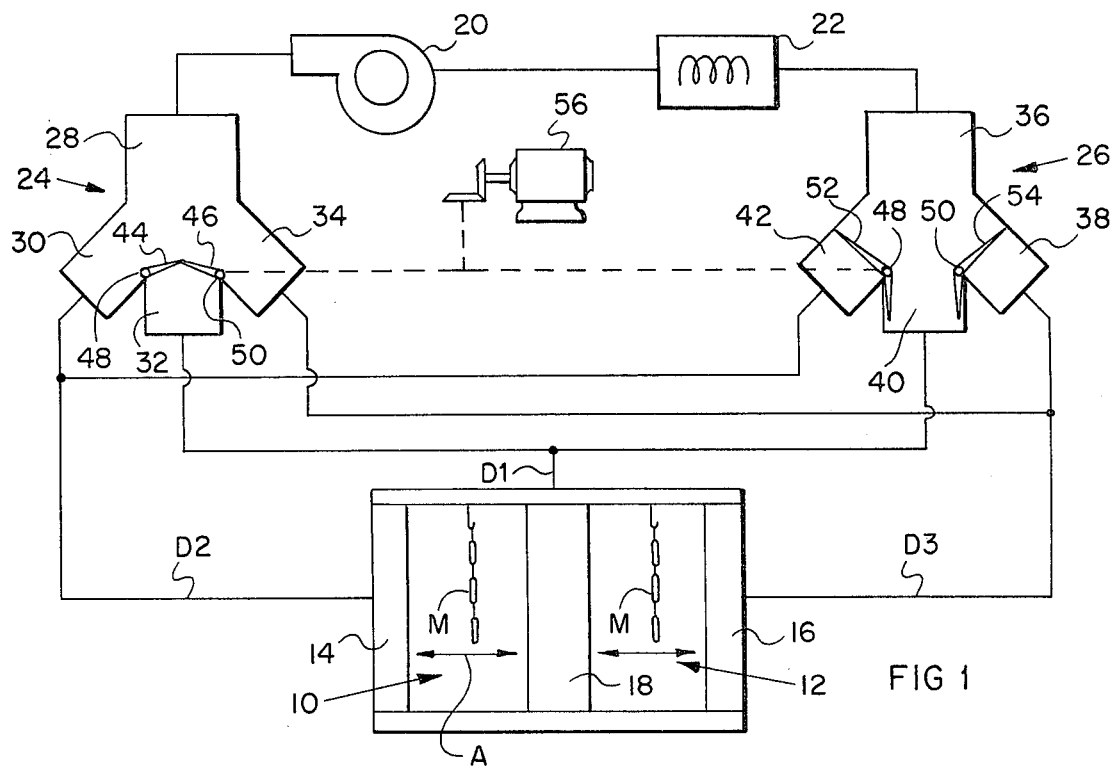
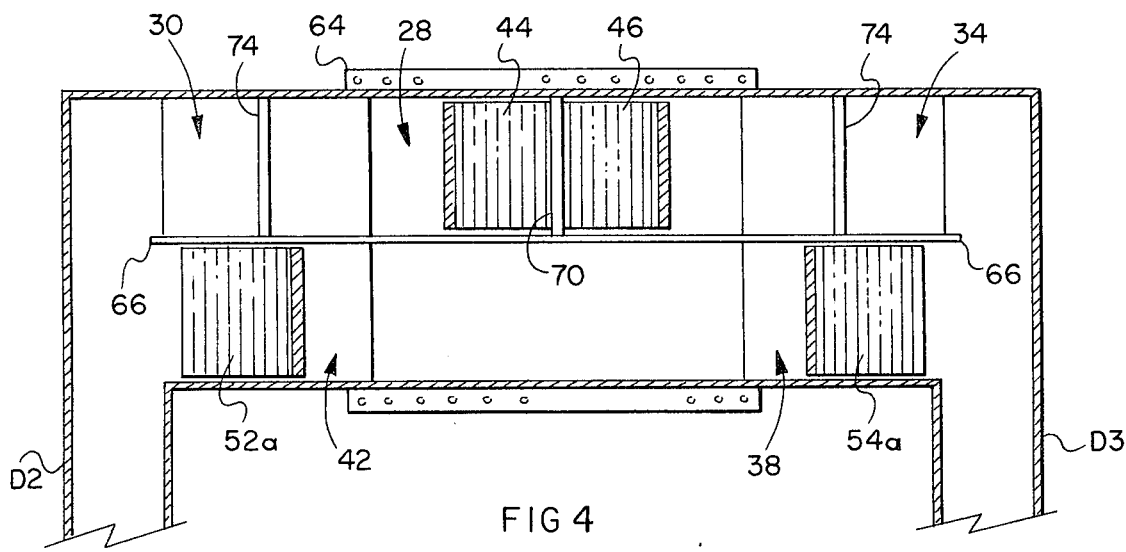
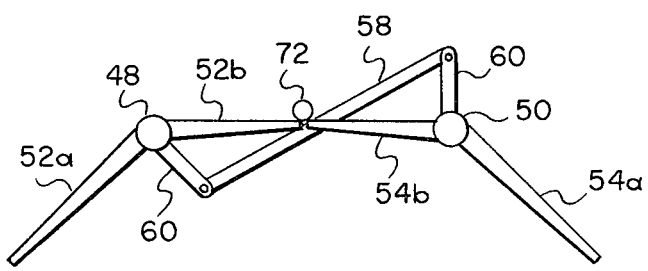

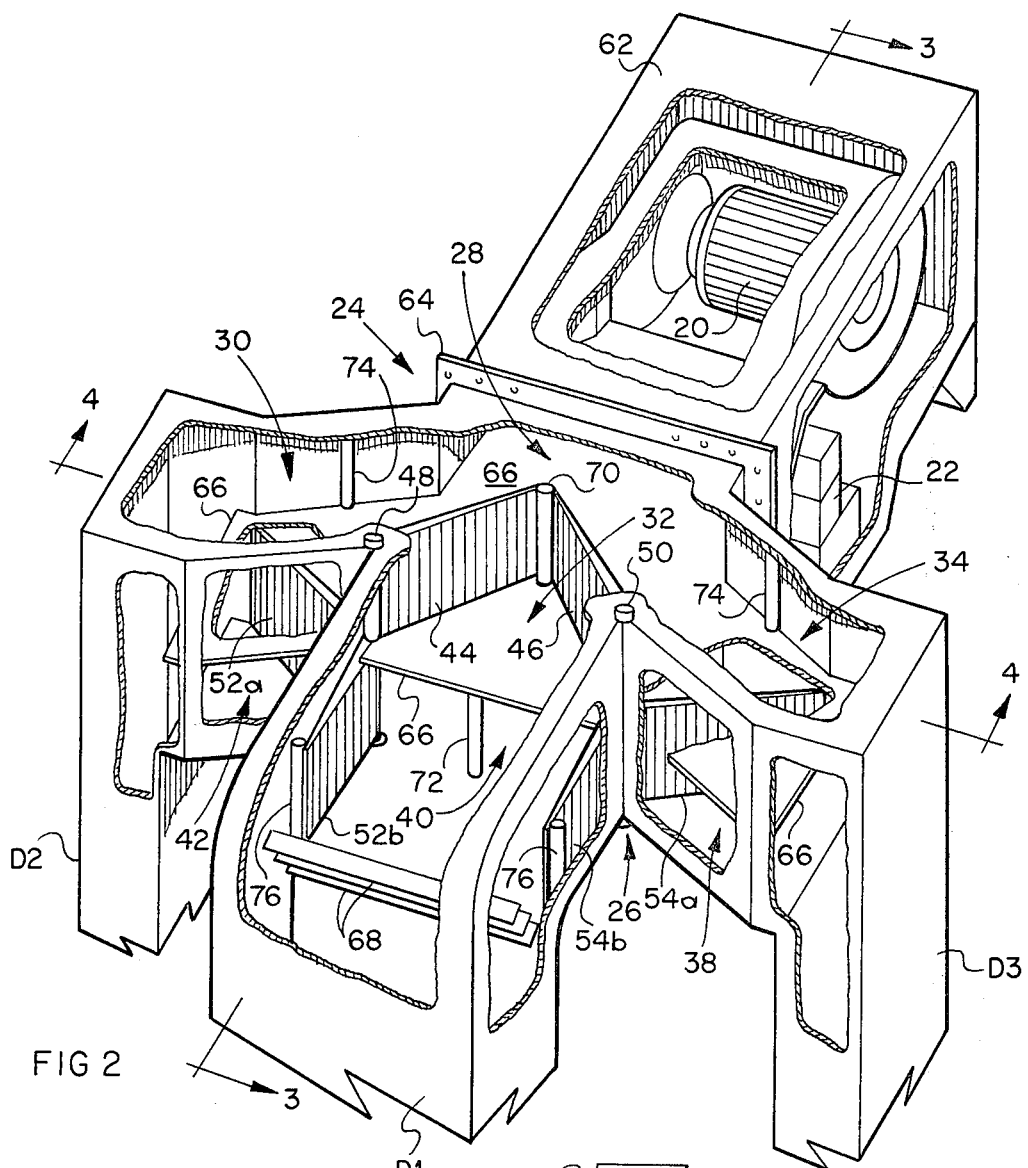
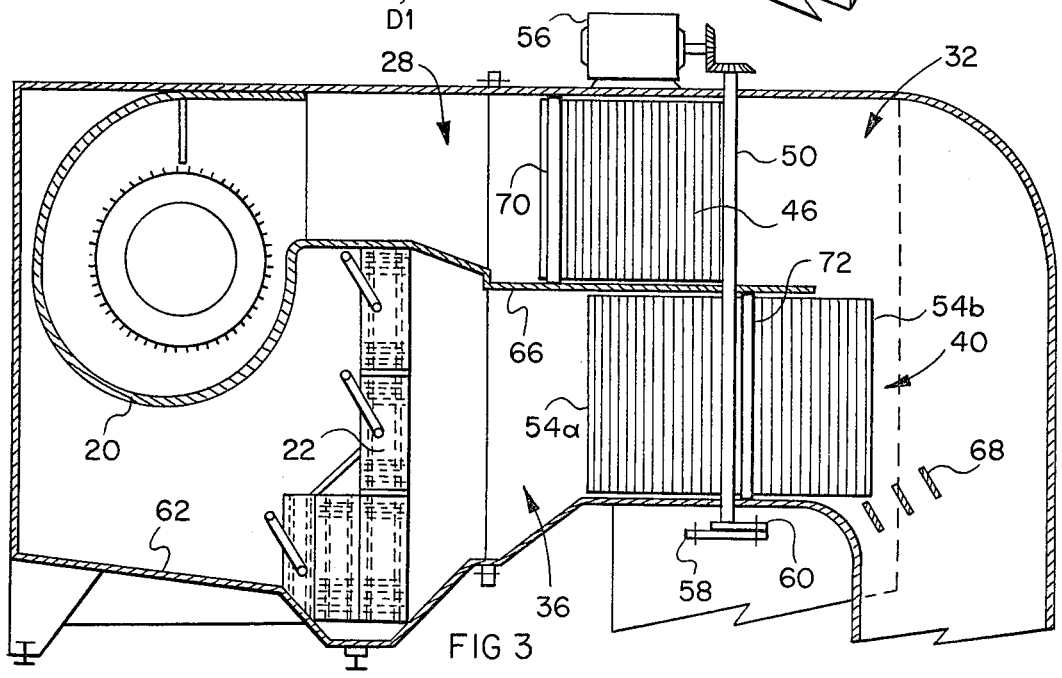

AIR FLOW REVERSER SYSTEM

The invention relates to an air flow reverser for use in association with fan systems.

BACKGROUND OF THE INVENTION

Where an air flow system employs supply and return ducts, and a fan system for circulating air therethrough, it is sometimes desireable to provide that the direction of air flow can be reversed so that the return ducts become the supply ducts and the supply ducts become the return ducts.

This is of course can be achieved by using two fans. In the majority of cases however this is too costly. In addition, if the circulation system also incorporates some form of air treatment such as heating or cooling coils or humidifiers and the like, or electronic air cleaners then the use of two fans does not solve the problem.

Proposals have been made whereby the actual fan itself is reversable ie air can flow through the fan rotor in either direction. These systems however suffer from various technical disadvantages. In the great majority of cases, the engineering of the fan system will be such that the greatest efficiency is obtained only in a preferred direction. When the fan is reversed, there is usually a considerable loss in efficiency. In certain other circumstances, various crude forms of moveable baffles have been proposed so that the direction of air flow may be reversed. Again however such systems almost invariably operate at maximum efficiency only in one condition.

In the particular circumstances of the present invention, it is desireable that the volumes of air flow in either direction shall be essentially equal, so that air flows take place in either direction with equal efficiency. The present invention is particularly designed to be applied to the provision of air circulation in chambers or "ovens" used for processing meat products for example drying, smoking or chilling etc. of such products. Usually this takes place over fairly extended periods of time, for example 24 hours or more, at a predetermined temperature and at a predetermined humidity range within the chamber whereby the meat products are subjected to such processing under carefully controlled conditions to produce predictable results, time after time during treatment.

Such meat products are treated in fairly large batches, and it is of course desireable that all the meat products in any one batch shall be subjected to more or less precisely the same air temperature and humidity so that they are all processed simultaneously to the same extent.

For this purpose, the meat products are subjected to transverse air flow through the chamber, and the air flow through the chamber is reversed at predetermined time intervals so that all of the meat products are treated to the same extent.

BRIEF SUMMARY OF THE INVENTION

In order to overcome these various problems, the invention comprises an air flow reverser apparatus for use in association with an air flow system having air supply and return port means, said apparatus comprising;

a main supply duct, and a main return duct, said ducts being connectible to said respective supply and return port means of said air flow system;

at least two branch supply ducts communicating with said main supply duct;

at least two branch return ducts communicating with said main return duct;

supply damper means for selectively shutting off at least one of said branch supply ducts, while leaving at least one said branch supply duct open, return damper means for selectively shutting off at least one of said branch return ducts while leaving at least one said branch return duct open, and means interconnecting said supply and return damper means whereby when a selected one of said branch supply ducts is closed, a selected one of said branch return ducts is open, and power operated means for moving the same from one position to another, simultaneously.

In use, assuming the chamber has two air vent openings, one of each of the branch supply ducts and branch return ducts is connected to the one vent opening, and another of each of the branch supply ducts and branch return ducts is connected to the other vent opening. In this way air can be supplied to either one of the vent openings and withdrawn through the other, thus procuring air flow in either direction.

The invention further preferably provides for the supply and return of air in selected directions through two chambers simultaneously, the two chambers having a common median partition wall.

For this purpose, the invention comprises a main supply duct, and a main return duct, three branch supply ducts connecting with said main supply duct, and three branch return ducts connecting with said main return duct, supply damper means operable selectively for closing of either two, or one of said branch supply ducts, return damper means for selectively closing of either two or one of said return branch ducts in unison, whereby when one of said damper means is closing of two said ducts the other of said damper means is closing of only one of said ducts, and power operated means for moving the same from one position to the other.

The invention further comprises that the main supply duct, and the main return duct are of integral one piece construction, with a median partition wall extending through said structure, and dividing it into said supply and return ducts, and further comprises that said branch supply and return ducts are provided by integral main ducts structure respective branch supply and return ducts by median walls, into respective pairs each comprising one said branch supply duct and one said branch return duct, and each of said pairs of branch ducts being connected to a respective common branch duct extension, whereby three said branch duct extensions may be connected with air outlet means, which air outlet means may be used either for the supply of air or the return of air as desired.

The invention further comprises that said damper means for said branch supply ducts and for said branch return ducts shall be mounted in two sets, on respective common mounting shafts, with linkage means interconnecting one shaft with the other, and power operated means for driving one of the shafts in one direction or the other as desired to procure respective movements of said damper means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

In the drawings;

FIG. 1 is a schematic illustration showing the use of the air reverser apparatus, in association with meat curing chambers;

FIG. 2 is an upper perspective view of the air director apparatus according to the invention, cut-away to reveal its interior;

FIG. 3 is a section along the line 33 of FIG. 2;

FIG. 4 is a section along the line 44 of FIG. 2;

FIG. 7 is an illustration of the linkage means interconnecting the damper elements.

DESCRIPTION OF A SPECIFIC EMBODIMENT

Figure 5:
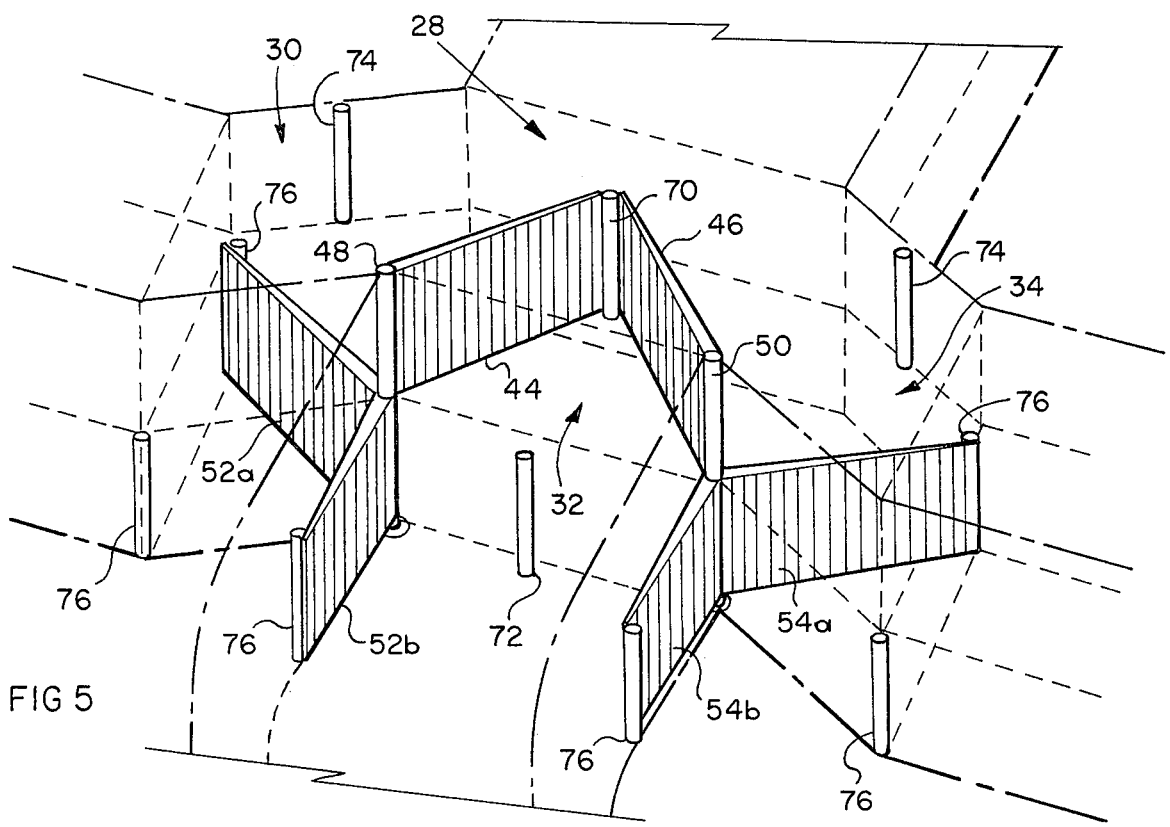
FIG. 5 is a schematic illustration of the apparatus, the entire duct work being shown in phantom, and showing the damper means in one position, corresponding to that shown in FIG. 2, and, FIG. 6 is an illustration corresponding to FIG. 5, showing the damper means in the opposite position.

Referring to FIG. 1, two meat curing chambers or "ovens" 10 and 12 are shown, containing meat products M suspended therein by any suitable means. It will of course be understood that such chambers are of considerable size, and may contain many thousands of pounds of meat products, which will be treated over a lengthy period of for example 24 hours.

During this time the process which may be a chilling, curing, drying or smoking etc., process is carried out by means of flowing air transversely across the chambers first in one direction for a period of time, and then in the reverse direction for a period of time.

The air will be at a controlled temperature having a predetermined humidity, so as to produce a predetermined predictable treatment of the meat products.

The meat chambers 10 and 12 comprise outer air plenum wall chambers 14 and 16, and an intermediate plenum wall chamber 18. The wall chambers are provided with wall surfaces which are essentially perforated, or define a large number of air flow openings over the whole extent of the wall, with such openings being provided on both sides of the intermediate wall 18. In one mode of operation air may flow through the walls 14 and 16 across the chambers 10 and 12 and be exhausted through wall 18. In the other mode of operation, air is supplied through wall 18 across both chambers 10 and 12 and is exhausted through walls 14 and 16, air flow taking place essentially in the direction in the arrow A depending upon the mode of operation.

The purpose of the invention is to provide for air flow reversers, which may direct the air either to the side walls 14 and 16, and return it via the wall 18, or alternatively may direct air to the wall 18 and return it via the walls 14 and 16. The air is cycled continuously round in a closed circuit, and is subjected to suitable treatment to maintain preset conditions.

In FIG. 1 the various connecting ducts are shown as single lines and indicated by the reference D, for the sake of simplicity. It will however, be appreciated that very large volumes of air are being moved in a gently flowing manner and in fact, such ducts will be of considerable size, in accordance with the requirements well known in the art.

Air flow is maintained by means of a fan 20, and air chilling or heating and humidification or dehumidification is carried out by the air treatment unit indicated at 22, the details of which are omitted for the sake of clarity. Typically the unit 22 will comprise known heat exchanger coils, and may include smoke venting means, or other air treatment (not shown).

The air directors according to the invention are illustrated schematically as a supply director unit 24, and a return director unit 26. It will be noted that the supply director 24 is connected to the outlet of the fan 20, and the return director 26 is connected to the upstream end of the tempering unit 20.

Again, the illustration of FIG. 1, for the purposes of clarity shows the two director units 24 and 26 as being separate structures.

However, as will be seen from the following description they are in fact constructed essentially in a one piece integral structure, with the supply unit 24 being located above and the return unit 26 being located beneath, the two units being separated essentially by a single partition wall.

The supply director unit 24 comprises a main supply duct 28, and three branch supply ducts 30, 32 and 34. The central branch duct 32 is seen to be connected via a duct D 1 to the intermediate partition wall 18 of ovens 10 and 12.

The two side branch ducts 30 and 34 are connected respectively via ducts D 2 and D 3 to side walls 14 and 16 of ovens 10 and 12.

In this way, if supply air is directed so as to flow only through the central branch duct 32, then it will be supplied via duct D 1 to the intermediate wall 18.

On the other hand if air is controlled so that it may flow only through the two branch ducts 30 and 34 and not through the central duct 32, then air will be supplied via ducts D 2 and D 3 to the two side walls 14 and 16.

The return director unit 26 comprises a main return duct 36, and three branch return ducts 38, 40 and 42. The central branch return duct 40 is connected by duct D 1 to the intermediate partition wall 18, and the two side branch return ducts 38 and 42 are connected via ducts D 2 and D 3 to side walls 16 and 14 of ovens 10 and 12.

In this way, when the central branch return duct 40 is open and the two side branch return ducts are closed, then air may be exhausted through intermediate wall 18. Conversely, when the central branch return duct 40 is closed and the two side branch ducts 42 and 38 are open, then air may be exhausted via walls 14 and 16.

In order to control flow of air within the respective director units 24 and 26, a system of moveable damper blades are provided. The supply director unit 24 is provided with a pair of single damper blades 44 and 46 mounted respectively on shafts 48 and 50.

The return director unit 26 is provided with a pair of double bladed dampers 52 and 54 also mounted on shafts 48 and 50. Rotation of shafts 48 and 50 will thus procure rotation both of damper blades 44 and 46 and double damper blades 52 and 54.

Rotation of such shafts 48 and 50 is procured by any suitable motor means such as motor 56, driving one of the shafts, and any suitable linkage means such as the rod 58, may couple the shafts through cranks 60 (see FIG. 7). The linkage 58 may be located underneath the return director unit 26, or may equally well be located on the top, wherever it is most convenient.

As best shown in FIGS. 2, 3 and 4, the two director units 24 and 26 are composed of sheet metal forming generally rectangular ductwork, in a manner known in the art.

In addition, the fan 20 and coils 22 are enclosed within a sheet metal housing 62, which is coupled to main supply duct 28 and main return duct 36 as at the flange 64.

A horizontal partition wall 66 separates the main supply duct 28 from the main return duct 36, and extends between the single bladed dampers 44 and 46 in the supply duct, and the double bladed dampers 52 and 54 in the return duct.

The same partition wall 66 extends beyond such damper blades so as to separate branch supply ducts 30, 32 and 34 from branch return ducts 38, 40 and 42.

As will be seen from FIG. 2, the duct D 1 connects directly with the open ends of the central branch supply duct 32 and the central branch return duct 40, and likewise the duct D 2 connects directly with the open ends of branch supply duct 30 and branch return duct 42 and in the same way duct D 3 connects directly with the open ends of branch supply duct 34 and branch return duct 38.

In order to smooth out the air flows in duct D 1, a series of parallel air director blades 68 are located therein which assist in avoiding turbulence.

In order to limit the movement of the damper blades, a stop post 70 is located in the centre of main supply duct 28, and a similar post 72 is located in the centre of branch return duct 40.

In addition, similar posts 74 are located towards the side of branch supply ducts 30 and 34, and posts 76 are located along the sides of branch return duct 40.

Figure 6:
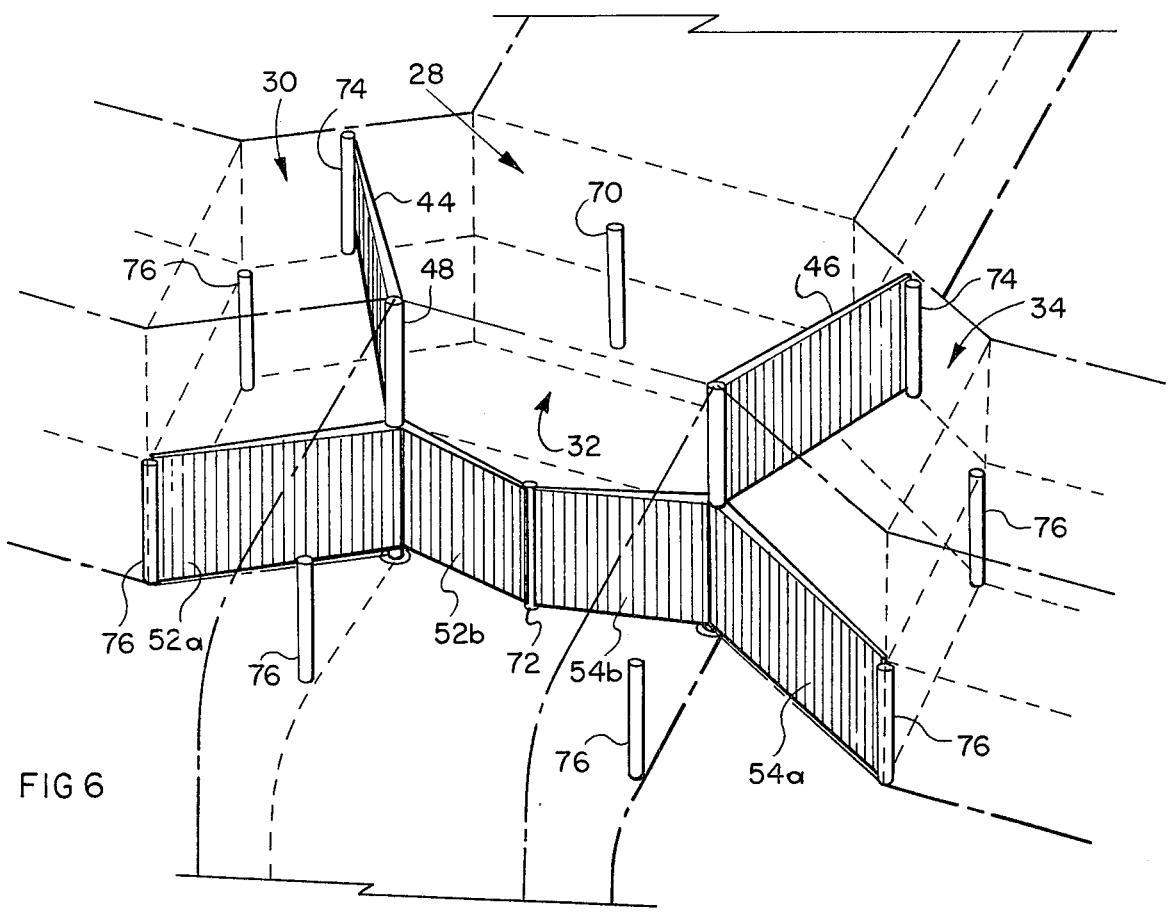

Similar posts 76 are located on the side walls of branch return ducts 38 and 42 (see FIGS. 5 and 6).

The operation of the air director units of the invention is best understood with reference to FIGS. 5 and 6.

In the first mode of operation as shown in FIG. 5, the damper blades 44 and 46 are moved across into contact with central post 70, thereby shutting off central branch supply duct 32, and opening the side branch supply ducts 30 and 34.

The double damper blades 52 and 54 are swung so that the damper blades 52 A and 54 A are in contact with post 76 shutting off side branch return ducts 38 and 42, and the damper blades 52 B and 54 B are swung apart, contacting the posts 76 on the side walls of central branch return duct 40, thereby opening up branch duct 40.

Operation of fan 20 will procure flow of air into main supply duct 20, and it will then be split into two streams by the damper blades 44 and 46, which being located at a more or less 45° angle to the direction of flow of air, effectively split or divide the air and guide one half down side branch supply duct 30 and the other half down side branch supply duct 34.

Such air flow will then be carried down ducts D 2 and D 3 into walls 14 and 16. It will then flow across chambers 10 and 12, and be exhausted through wall 18 and duct D 1.

Exhaust or return air will then flow up duct D1, and into central branch return duct 40 and directly therethrough into main return duct 36, through the coil 22 and back into the fan 20.

Air circulation is thus continuous and uninterrupted.

After a predetermined period of time, for example one hour, motor 56 is operated so as to rotate shaft 50 in a clockwise manner and shaft 48 in an anti-clockwise manner. This will cause damper blades 44 and 46 to swing apart and eventually contact post 74 on the side walls of branch ducts 30 and 34. Thus branch duct 30 and 34 will be closed off and central branch supply duct 32 will be opened up.

Similarly, the damper blades 52 and 54 will also be swung, bringing blades 52A and 54A into contact with the opposite post 76 on the side walls of branch return ducts 38 and 42 thereby opening up branch supply ducts 38 and 42, and damper blades 52B and 54B will be swung together into contact with post 72 thereby closing off central branch return duct 40 (see FIG. 6). In this mode of operation, air will flow from fan 20 directly through main supply duct 28 and central branch supply duct 32 into duct D 1, and will flow into wall 18 from which it will flow outwardly in both directions across chambers 10 and 12.

Air from chambers 10 and 12 will be exhausted through walls 14 and 16 and back up through ducts D 2 and D 3, and will return through side branch return ducts 38 and 42 and then enter main return duct 36 and pass through the coils 22 and back into the fan 20.

Circulation of air in this mode of operation is also continuous and uninterupted until operation of motor 56 once more.

It will be noted that in both modes of operation the fan is operating in the same direction, so that the same volume of air flow will take place regardless of which mode of-operation is selected.

It will of course be understood that the entire operation will be automatically timed and controlled with suitable thermostats and humidification and other controls, and timers for the operation of the motor 56, all of which are well known in the art and are omitted for the sake of clarity.

The foregoing is a description of a preferred embodiment of the invention which is given here by way of example only. The invention is not to be taken as limited to any of the specific features as described, but comprehend all such variations thereof as come within the scope of the appended claims.

What is claimed is:

1. An air flow reverser apparatus for use in association with an air flow system having air supply and return port means, said apparatus comprising;
   a main supply duct, and a main return duct, said ducts being connectable to said respective supply and return port means of said air flow system;
   three branch supply ducts communicating with said main supply duct;
   three branch return ducts communicating with said main return duct;
   supply damper means movably operable for selectively shutting off either one, or two of said branch supply ducts, while leaving the remainder of said branch supply ducts open;
   return damper means movably operable for selectively shutting off either two, or one of said branch return ducts while leaving the remainder of said branch return ducts open;
   means interconnecting said supply and return damper means for movement in unison whereby when a selection of said branch supply ducts is closed, a selection of said branch return ducts is open, and, power operated means for moving the same from one position to another, simultaneously.

2. An air flow reverser apparatus as claimed in claim 1 wherein said supply damper means comprise two single bladed dampers, each said damper being rotatably mounted, for rotation about one edge thereof, and including damper mounting means rotatably mounting the same and defining an axis of rotation along said one edge of each one of said two damper blades, whereby the same may be swung inwardly towards one another in one of said positions and outwardly away from one another in the other of said positions, and wherein said return damper means comprise two double-bladed dampers, said blades meeting at an obtuse angle, and rotatable damper mounting means extending along the junction between said two blades, whereby each of said double bladed dampers is rotatable about the apex of said obtuse angle, between said two positions aforesaid.

3. An air flow reverser apparatus as claimed in claim 2 wherein said main supply duct and said main return duct are formed as an integral structure and are separated by means of a partition extending through said integral structure, whereby to locate said main supply duct in an upper location and said main return duct in an immediately adjacent lower location, lying along parallel axes to one another, and wherein said three branch supply ducts comprise a central branch supply duct and two side branch supply ducts extending on either side of said central branch supply duct, and wherein said three branch return ducts comprise a central branch return duct and two side branch return ducts on either side thereof.

4. An air flow reverser apparatus as claimed in claim 3 wherein said single bladed dampers and said double bladed dampers are rotatably mounted on a common axis, and wherein said damper blade mounting means therefor extend along said common axes and are directly connected to one another, for rotation on parallel spaced apart axes, said axes being located on opposite sides of said central branch supply and return duct.

5. An air flow reverser apparatus as claimed in claim 4 including stop means located in said main supply duct, and engageable by said single bladed dampers when the same are swung together, and including, stop means located in said central branch return duct, and engageable by said double bladed dampers.

6. An air flow reverser apparatus as claimed in claim 3 including an integral housing connected to said main supply and return ducts, fan means in said housing communicating with said main supply duct, said housing establishing an air flow path from said main return duct through said fan into said main supply duct, and including air treatment means located in said housing in said air flow path, for treatment of air flowing therethrough.

7. An air flow reverser apparatus as claimed in claim 3 wherein said branch supply ducts and branch return ducts include integral extensions of said integral main supply and main return duct structure, and wherein said partition means extend partially into said integral extensions, thereby dividing them into upper branch supply ducts and lower branch return ducts, communicating with respective main supply ducts and main return ducts.

8. An air flow reverser apparatus as claimed in claim 7 including two common side duct means connected respectively to respective pairs of said branch supply and return ducts, and adapted to receive air flow in either direction therethrough, and further including common central duct means connecting with said central supply and return ducts, and adapted for two way flow of air therethrough.

* * * * *